US006920434B1

(12) United States Patent
Cossette (10) Patent No.: US 6,920,434 B1
(45) Date of Patent: Jul. 19, 2005

(54) COMPUTERIZED SYSTEM AND METHOD FOR ESTABLISHING A LOAN PARTICIPATION NETWORK

(75) Inventor: Paul H. Cossette, Gilford, NH (US)

(73) Assignee: Genesis Three Corporation, Gilford, NH (US)

(*) Notice: Subject to any disclaimer, the term of this patent is extended or adjusted under 35 U.S.C. 154(b) by 1099 days.

(21) Appl. No.: 09/161,787

(22) Filed: Sep. 28, 1998

(51) Int. Cl.$^7$ ............................................. G06F 17/60
(52) U.S. Cl. ....................................................... 705/38
(58) Field of Search ........................................... 705/38

(56) References Cited

U.S. PATENT DOCUMENTS

| 5,940,812 | A | * | 8/1999 | Tengel et al. | ................. | 705/38 |
| 5,966,699 | A | * | 10/1999 | Zandi | ........................... | 705/38 |
| 5,966,700 | A | * | 10/1999 | Gould et al. | ................... | 705/38 |
| 6,023,686 | A | * | 2/2000 | Brown | ......................... | 705/37 |
| 6,385,594 | B1 | * | 5/2002 | Lebda et al. | ................... | 705/38 |

FOREIGN PATENT DOCUMENTS

WO        WO 99/59084     * 11/1999 ........... G06F/17/30

OTHER PUBLICATIONS

Young, Earni, "Bank Coalition to Loan $ 3.2 Million for Low–Income Housing in New Jersey," Philadelphia Daily News, Jun. 1993.*
Anonymous, "Participation Lending at Citicorp Industrial Credit, Inc.," Journal of Buyouts & Acquisitions, vol. 2, No. 3, pp. 15–18, Feb. 1984.*
Tebbe, Mark, "If Bankers Can Use the Internet to make Big Bucks, Why Can't You?," InfoWorld, vol. 19, No. 39, p. 152, Sep. 1997.*

"IntraLInks, Inc. Begins European Rollout Of Its Proven Electronic Solution for Loan Syndication," press release retrieved from the Internet: <URL: http://www.intralinks.com/pressurel/europe.htm.> on Sep. 11, 2000, Oct. 1997.*
Ben–Amos, Omri, "Intralinks Introduces Service for Monitoring Loans," American Banker, p. 11, Jan. 1998.*
"Today's News," American Banker, vol. 163, No. 87, p. 1, May 1998.*
"Global Industry: Extranets—Still Unproven," EIU Views-Wire, May 1998.*

(Continued)

Primary Examiner—Susanna M. Diaz
(74) Attorney, Agent, or Firm—Bourque & Associates (57) ABSTRACT

A computerized system and method establishes a loan participation network between a plurality of network members. The network members complete application forms with member data and loan criteria, which is used to establish a loan participation database. When a network member has a loan participation opportunity, e.g., a borrower requests a loan from a network member, the network member completes a loan offering form with loan data for the loan participation opportunity. The system receives the loan participation offer from the offering network member and searches the database for loan data matching the loan participation data and obtains the matching loan data. The matching loan data and associated network member data is then transmitted to the offering member. The offering member selects one or more matching network members and transmits the selection(s) to the system. The system receives the selection from the offering network member and transmits offers to the selected network members. The interested selected matching members can then respond to the offers, and the system receives the response(s) from the interested selected members and transmits interested member data to the offering member. The offering network member can then contact the interested network members to explore the opportunity to participate in granting a loan.

20 Claims, 5 Drawing Sheets

OTHER PUBLICATIONS

Dalton, Gregory, "Acceptable Risks," Information Week, pp. 36–48, Aug. 1998.*

Maney, Kevin, "Iridium the First Virtual Nation," USA Today (final ed.), Money section, p. O2B, Sep. 1998.*

Critchley, Barry, "Atlantis Deal is a Cyber–Syndication," Financial Post Daily, vol. 11(137), p. 5, Sep. 1998.*

Power, Carol, "Electronic Commerce: PNC Using Lotus Notes for Wide Range of Tasks," American Banker, vol. 163, No. 238, p. 16, Dec. 1998.*

Duvall, Mel, "IntraLinks Builds Up Accounts," Inter@ctive Week, vol. 6, No. 24, p. 41, Jun. 1999.*

* cited by examiner

MEMBER APPLICATION FORM

BANK NAME            TRANSIT NUMBER
MAIL ADDRESS       ELECTRONIC ADDRESS      VOICE      FAX CHIEF EXECUTIVE OFFICER      SENIOR CREDIT OFFICER PREFERRED CREDITS: The following questionnaire is designed to record the basic asset criterion required by your organization for possible credit participations.

LOCs: (Check any)
Unsecured Working Capital          ( )
Secured Working Capital            ( )     Properly margined cash or marketable securities Asset Based Working Capital.
     Periodic Borrowing Base       ( )
     Controlled A/R and Inventory   ( )
Revolving Credits                  ( )     LOCs with a maturity and term loan conversion feature
Standby LOCs and Int'l LCs       ( )     Off balance sheet fee based facilities SIZE.         Minimum ( $_ _,_ _ _,000.)      Maximum ( $_ _,_ _ _,000.)
RATE:       Minimum Floating (WSJ Prime + _ _ _%) (LIBOR + _._ _ %) Minimum Fixed ( _ _ _ _%)

TERM LOANS. (Check any)
Equipment Loans and Leases     ( )
Permanent Working Capital       ( )     May be secured or unsecured
Owner Occupied Commercial RE   ( )
Other Commercial RE              ( )
Construction Loans                 ( )

SIZE:        Minimum ($_ _,_ _ _,000.)      Maximum ($_ _,_ _ _,000 )
RATE:       Minimum Floating: (WSJ Prime + _ _ _%) (LIBOR + _._ _%) Minimum Fixed ( _ _ _ _%)

LOCATION: (Check one) Please indicate location preference for participation assets: Same state only ( ), Same or contiguous states ( ) Regions: Northeast ( ), Southeast ( ), Midwest ( ), Southwest ( ), West ( )

BUSINESS TYPES. (Check any) Wholesale ( ), Retail ( ), Service ( ), Manufacturing ( )

INDUSTRIES: (Check any) Computer Hardware ( ), Computer Software ( ), Biotech/Pharmaceuticals ( ), Hospitality ( ), Healthcare ( ), Foodstuffs ( ), Financial Services ( ), Construction ( ), Real Estate ( ), Education ( ), Professions ( ), Transportation ( ), Agriculture ( ), Energy ( ), Communications ( ), Entertainment ( ), Food Service ( ) Non-profits MINIMUM ACCEPTABLE FINANCIAL REPORTING LEVEL:     CPA Audit ( )    CPA Review ( )

MINIMUM PROSPECT DATA REQUIREMENT. Raw Data ( ), Spread and analysis ( ), Most recent loan review ( )

BANK FINANCIAL DATA. Date _ /_ /_ _ , Total assets ($_ _,_ _ _,000 ), LDR ( _ _ ), T1 Cap /TA ( _ _ _ )
TACA/TA ( _ _ _ ), TACA/T1 Cap (._ _ _ )

LOAN OFFERING FORM

FROM

BANK NAME          TRANSIT NUMBER
MAIL ADDRESS      ELECTRONIC ADDRESS      VOICE      FAX CHIEF EXECUTIVE OFFICER      SENIOR CREDIT OFFICER Unsecured Working Capital      ( )
Secured Working Capital      ( )      Properly margined cash or marketable securities Asset Based Working Capital:
     Periodic Borrowing Base      ( )
     Controlled A/R and Inventory      ( )
Revolving Credits      ( )      LOCs with a maturity and term loan conversion feature
Standby LOCs and Int'l LCs      ( )      Off balance sheet fee based facilities SIZE      ($_ _,_ _ _.000 )
RATE      (WSJ Prime + _ _ _%) (LIBOR + _._ _ %) Fixed ( _ _ _ _%) Fee ( _ _ _ _%)

<u>TERM LOANS:</u>
Equipment Loans and Leases      ( )
Permanent Working Capital      ( )      May be secured or unsecured
Owner Occupied Commercial RE      ( )
Other Commercial RE      ( )
Construction Loans      ( )

SIZE      ($_ _,_ _ _.000 )
RATE·      (WSJ Prime + _ _ _%) (LIBOR + _ _ _%) Fixed ( _ _ _ _%)

<u>LOCATION:</u>

<u>BUSINESS TYPE:</u> Wholesale ( ), Retail ( ), Service ( ), Manufacturing ( )

<u>INDUSTRY:</u> Computer Hardware ( ), Computer Software ( ), Biotech/Pharmaceuticals ( ), Hospitality ( ), Healthcare ( ), Foodstuffs ( ), Financial Services ( ), Construction ( ), Real Estate ( ), Education ( ), Professions ( ), Transportation ( ), Agriculture ( ), Energy ( ), Communications ( ), Entertainment ( ), Food Service ( ) Non-profits <u>FINANCIAL REPORTING LEVEL.</u>      CPA Audit ( )      CPA Review ( )

<u>BANK FINANCIAL DATA:</u> Date _ _/_ _/_ _, Total assets ($_ _ _,_ _ _.000 ), LDR ( _ _ ), T1 Cap/TA ( _ _ _ )
TACA/TA ( _ _ _ ), TACA/T1 Cap ( _ _ _ )

COMPUTERIZED SYSTEM AND METHOD FOR ESTABLISHING A LOAN PARTICIPATION NETWORK

FIELD OF THE INVENTION

The present invention relates to computerized systems and methods for establishing specialized networks, and in particular, to a computerized system and method for establishing a loan participation network.

BACKGROUND OF THE INVENTION

As consolidation continues in the U.S. banking industry, there is a strong potential threat to the financial well being of members of a major U.S. commercial customer segment and their 30,000,000 employees. That group is comprised of some 1,600,000 U.S. businesses with sales of $500,000 to $50,000,000, many of which are rapidly growing and innovative and hold the key to our future economic success. This group of commercial banking customers also depends on close personal attention, customized and reliable credit services, and prompt responses to their credit needs—requirements that will not be the primary focus of our new trillion dollar bank holding companies.

These small to lower mid-market businesses are unlike very large companies, which have powerful leverage as well as alternate sources of funds in the capital markets. These businesses are also unlike very small (i.e. "mom and pop") businesses and retail customers, which, by and large, are much less dependent on their banks, can move from bank to bank with relative ease, and utilize standard credit products.

When seeking a commercial credit relationship, most businesses in this group would welcome the opportunity to borrow from a local bank or financial institution over a larger bank or financial institution headquartered thousands of miles away. The officers and other employees in a local financial institution, such as an independent community bank or thrift with assets of less than $500,000,000, are likely to have a better understanding of a business within their community and the benefits of that business to local industry and to the community in general. A local financial institution can also be more responsive to the needs of the local business and has a greater interest in meeting those needs for the overall benefit of the community and its local industries. Moreover, when dealing with a local financial institution, a business is likely to enjoy preferred customer status and the attention of top management in that financial institution.

Despite the many advantages of banking with local financial institutions, however, businesses must be confident that the community bank or thrift can match the product, price and operational standards of the larger financial institutions as well as be able to contribute to their company's growth. The greatest impediment to using independent community banks and thrifts for obtaining commercial credit is their limited lending power or capability. No matter how much a growing company may want to keep its banking local, if it needs a $3,000,000 credit facility, and the local bank's legal or house lending limit is one million dollars, it has no choice but to consider a larger bank. Thus, larger banks have a distinct advantage lending to the larger and growing local companies due to the size of the credit products they can offer.

Previously there were enough regional banks with sufficient lending power to take care of local companies. However, deregulation in the banking industry has resulted in consolidation, which continues to deplete the ranks of large regional banks and results in the formation of major bank holding companies (BHCs) located a great distance from their customers. As a result of bank consolidation, an increasing number of U.S. businesses are forced to rely on these major BHCs headquartered more than one thousand miles from the business. To retain existing small business customers and to compete with major BHCs in attracting growing companies, community banks and thrifts must be able to offer credit products and services, which are competitive to those offered by the larger financial institutions.

Given the advantages of and preferences for banking with community banks and thrifts, effective competition with the major BHCs is possible only if the community banks and thrifts can offer competitive commercial credit services. If the community banks and thrifts have sufficient funds, they could use their comparative advantage to defend their existing commercial customer base from the major BHCs as well as offer an alternative source of commercial borrowing to the local business customers of the major BHCs, i.e., the lower mid-market companies having sales of $5,000,000 to $50,000,000, which have always been the exclusive domain of the larger banks. Given sufficient funds, the independent community banks and thrifts could offer competitive products at competitive prices, coupled with more responsive service and support.

Accordingly, a need exists for a computerized system and method of establishing a loan participation network (or community credit network) that will allow community banks, thrifts and other financial institutions to pool their resources and offer large commercial credit accommodations to small to mid-size businesses as a collective lending entity. Besides increasing their legal lending limits, the loan participation network will improve liquidity among member community banks by utilizing excess cash from participating liquid banks to support banks with a need for cash. The loan participation network will allow community banks to offer products and services competitive to the major BHCs while maintaining the benefits of local banking for the local businesses and the community in general.

Benefits to the community banks participating in such a loan participation network include: expanded service offerings and greater flexibility; improved ability to retain growing commercial customers; improved average credit quality through portfolio diversification and risk spreading; improved growth and return on assets and equity; increased competition in the financial services industry; optimized Community Reinvestment Act (CRA) compliance; and enhanced franchise value of community banks due to improved competitive position and greater market share.

The benefits to local businesses include: the opportunity to enjoy preferred customer status; more timely response to credit requests; superior lending understanding of borrowers business and needs; consistency of service and stability of lending personnel; depth of backup support from network members; protection from arbitrary loan policy decisions or changes from distant BHCs; increased competition in the credit marketplace and expanded choice of banks; and improved access to capital funds as well as enhanced stability and dependability of capital sources.

Benefits to the communities include: broader local bank involvement in the communities; defense from arbitrary policies of distant BHCs, which negatively effect local industries and enterprises; strengthened and more attractive local business climate; optimal allocation of community financial resources in local and neighboring markets; and greater stability in the local employment base.

SUMMARY OF THE INVENTION

The present invention features a computerized system and method for establishing a loan participation network between a plurality of network members, such as community banks, thrifts and other local financial institutions. In the preferred embodiment, the network members are interconnected with a loan participation database by way of a data network. The method first comprises the step of establishing a loan participation database containing member data pertaining to each of the network members and loan criteria data specified by each of the network members. Establishing the loan participation database preferably includes receiving completed network member application forms from each of the network members including the member data and loan data. In one example, the network member application forms are electronically transmitted over the data network to the network members, and the completed network member application forms are electronically received from each of the network members over the data network. In one example, the method further includes the step of updating the loan participation network database.

The method further comprises the step of receiving a loan participation offer from an offering network member, which includes offering network member data and loan data pertaining to a loan participation opportunity. Receiving the loan participation offer preferably includes receiving a completed loan offering form from the offering network member. In one example, a loan offering form is electronically transmitted to the offering network member, and a completed loan offering form is electronically received from the offering network member over the data network.

The method further comprises the step of searching the loan participation database in response to the loan participation offer for matching loan data matching the loan data pertaining to the loan participation opportunity and obtaining matching member data for at least one matching network member associated with the matching loan data. The method then comprises the step of providing the matching member data for each matching network member to the offering network member, for example, by electronically transmitting the matching member data over the data network.

The method then comprises the step of receiving a selection of at least one selected matching network member from the offering network member, and providing or transmitting a loan participation offer to each selected matching network member in response to the selection of each selected matching network member.

The method then comprises the steps of receiving a response from at least one interested selected matching member, and providing or transmitting interested network member data pertaining to each interested selected matching member to the offering network member in response to the response(s) from interested network member(s). The offering network member can then discuss participation in the loan participation opportunity with the interested selected members as a collective lending entity.

The member data pertaining to each of the network members preferably includes at least a name of each of the network members and financial data pertaining to each of the network members. The loan criteria data specified by each of the network members is preferably selected from a group consisting of a loan type, a loan size range, an interest rate range, a business type, a desired industry, and a geographical location.

The computerized system of the present invention comprises the loan participation database containing member data pertaining to each of the network members and loan criteria data specified by each of the network members. The system further comprises a database management system, for entering the member data and the loan criteria data into the loan participation database, and for searching the loan participation database in response to a loan participation offer and obtaining the matching member data. A communications interface is linked to the data network and the database management system for controlling electronic communication between the network members and the database management system. The communications interface receives the loan participation offer from the offering member over the data network, transmits the matching member data for each matching network member to the offering network member over the data network, receives the selection(s) of each selected matching network member from the offering network member, transmits the loan participation offer to each selected matching network member over the data network in response to the selection, receives the response(s) from each interested selected matching member, and transmits to the offering network member interested network member data pertaining to each interested selected matching member over the data network.

DESCRIPTION OF THE DRAWINGS

These and other features and advantages of the present invention will be better understood by reading the following detailed description, taken together with the drawings wherein:

FIG. 3A is an illustration of a network member application form, according to one embodiment of the present invention;

DETAILED DESCRIPTION OF THE PREFERRED EMBODIMENT

Figure 1:
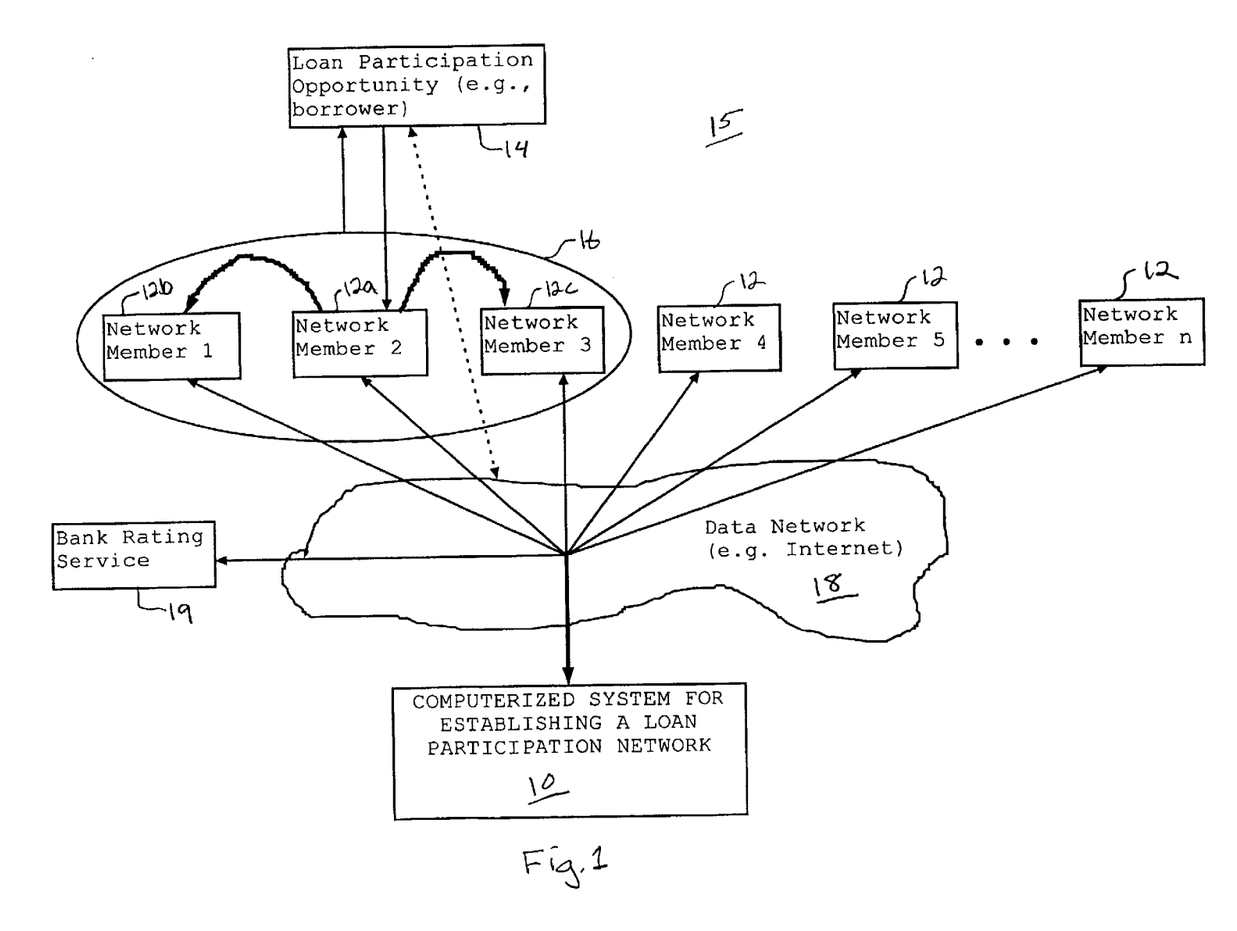
FIG. 1 is a schematic block diagram of a loan participation network established using the computerized system and method of the present invention.

The computerized system 10, FIG. 1, according to the present invention, is used to establish a loan participation network 15 with a plurality of network members 12 including independent community banks and thrifts as well as other types of lending or financial institutions. Multiple network members 12a, 12b, 12c can participate and pool their resources to provide a loan as a collective lending entity 16 when one of the network members 12a is presented with a loan participation opportunity. In one example, the loan participation opportunity arises when a borrower 14 requests a loan from one of the network members 12a. In one particular application, the borrower 14 is a small to mid-size company in need of a commercial loan, and the network member 12a is a community bank local to the company but without sufficient lending capability to provide the credit needed by the borrowing company. The network member 12a uses the computerized system 10 to find network member 12b, 12c (e.g. other community banks) with loan participation preferences compatible with the requested loan to offer a loan participation to those potential participating network members 12b, 12c. The offering network member 12a can then enter into a participation agreement with one or more interested network members 12b, 12c and obtain the necessary funds to provide the loan to the borrower 14 as the collective lending entity 16.

Alternatively, a loan participation opportunity can arise when a network member 12a wants to assure an existing customer of its lending potential. Another loan participation opportunity arises when a network member 12a wants to solicit a borrower with credit services. A further loan participation opportunity arises when a network member 12a wants to reduce its exposure with respect to an existing customer in a particular industry by allowing other network members 12b, 12c to participate in providing additional lending to the existing customer. The present invention contemplates any other loan participation opportunity where a network member 12a has a reason to participate with other network members 12b, 12c.

The network members 12 preferably communicate with the computerized system 10 electronically by way of a secure connection to a data network 18. In one example, the data network 18 is the Internet and the network members 12 and computerized system 10 communicate by way of the World Wide Web (WWW), E-mail, File Transfer Protocol (FTP), or by other means of secure electronic communication over the Internet using conventional internet communication software. Where the World Wide Web is used, for example, the computerized system 10 maintains a secure loan participation network "web site" that can only be accessed by network members 12 having a password. The network members 12 utilize the computerized system 10 by logging on to the secure "web site" and selecting the desired options, as will be described in greater detail below. The borrower 14 can also have access to the data network 18, for example, to post desired loan criteria to a public web site. Alternatively, the network members can directly dial in and connect to the system 10 and can communicate using specialized software.

Figure 2:
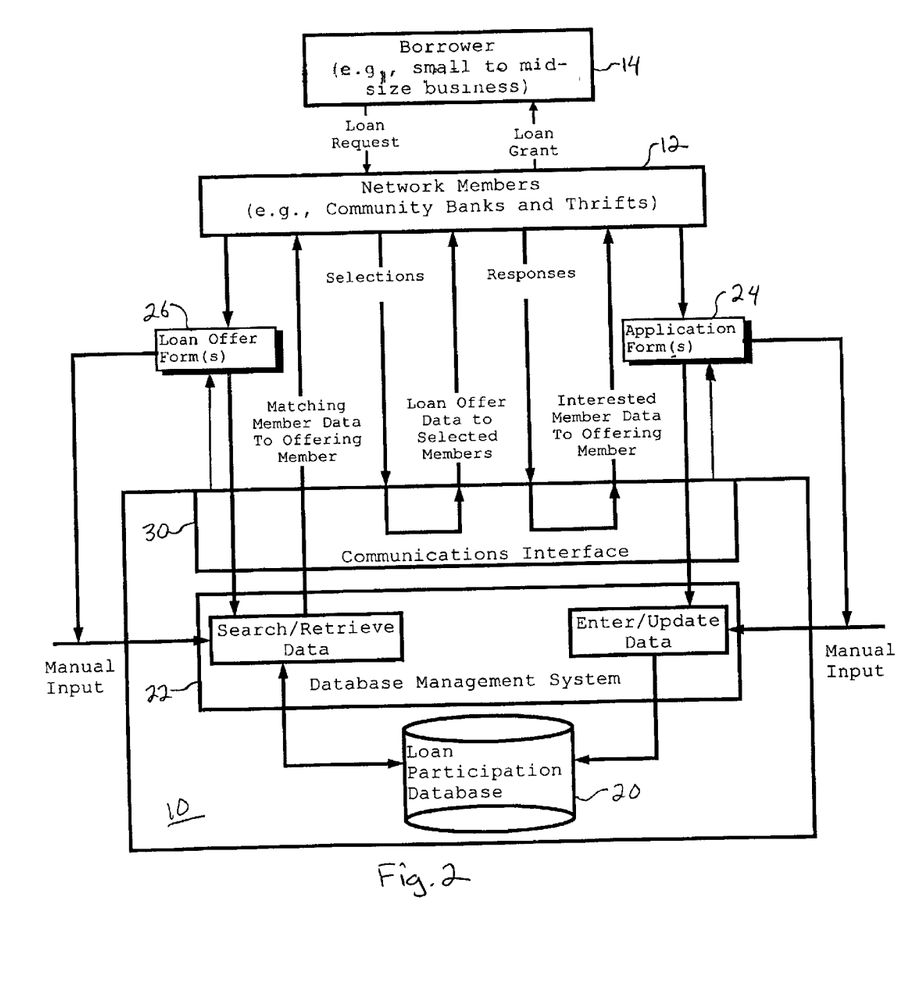
FIG. 2 is a functional block diagram of the computerized system for establishing the loan participation network, according to one embodiment of the present invention.

The preferred embodiment of the computerized system 10, FIG. 2, includes a loan participation database 20 for storing member data and loan criteria data and a database management system 22 for managing the entry and retrieval of data from the loan participation database. The member data pertaining to each of the network members 12 preferably includes, but is not limited to, the name, address (i.e., postal, E-mail, and/or WWW), network member ID number, and financial data of each network member. The financial data should be sufficient to enable each member to initially screen the suitability of a potential partner. The loan criteria data indicates the criteria that a loan would have to meet in order for a member to consider participation in the loan.

The loan criteria data specified by each of the network members 12 includes, but is not limited to, the loan type (e.g., line of credit (LOC), term loan, and the like), the loan size range, the interest rate range, the business type (e.g., retail, manufacturing, wholesale, service, and the like), the desired industries, and the geographical location (e.g., same state or region).

The network member data and loan criteria data are preferably obtained from a network member application form 24 submitted by each network member 12. One example of a network member application form and the member data and loan criteria data provided is shown in greater detail in FIG. 3A. Alternatively, at least some of the member data, such as financial data, can be obtained from a third party, such as bank rating service 19 that keeps the financial information current with automatic periodic updates. Banking regulatory agencies can also be linked to the system 10.

In one preferred embodiment, application forms 24 include electronic application forms in digital format that are electronically provided by the computerized system 10 to the network members 12 via the data network 18. Where the data network 18 is the Internet, for example, the blank application forms can be generated by the computerized system 10 and presented on a secure loan participation network "web page" using hypertext markup language (HTML) with blank data fields for entering the member data and loan criteria data. The network members 12 call up the application form 24 on the "web page," enter the member data and loan criteria data in data fields on the electronic application form, and electronically transmit the data to the computerized system 10 via a secure internet link. Alternatively, electronic application forms 24 can be transmitted and received using E-mail, FTP, or another means of electronic communication over the data network 18. The present invention also contemplates application forms that are transmitted and received by way of facsimile, regular mail, or any other means of delivery at the discretion of the network member.

The database management system 22 enters and/or updates the network member data and loan criteria data in the loan participation database 20. When an electronic application form is received electronically, the network member data and loan criteria data is automatically obtained by the database management system 22 and entered into the loan participation database 20. Alternatively, when an application form is received by way of regular mail, facsimile, or by other delivery methods, the data can be manually entered into the loan participation database 20 using the database management system 22 by way of a user interface as is well known in the art.

Figure 3B:
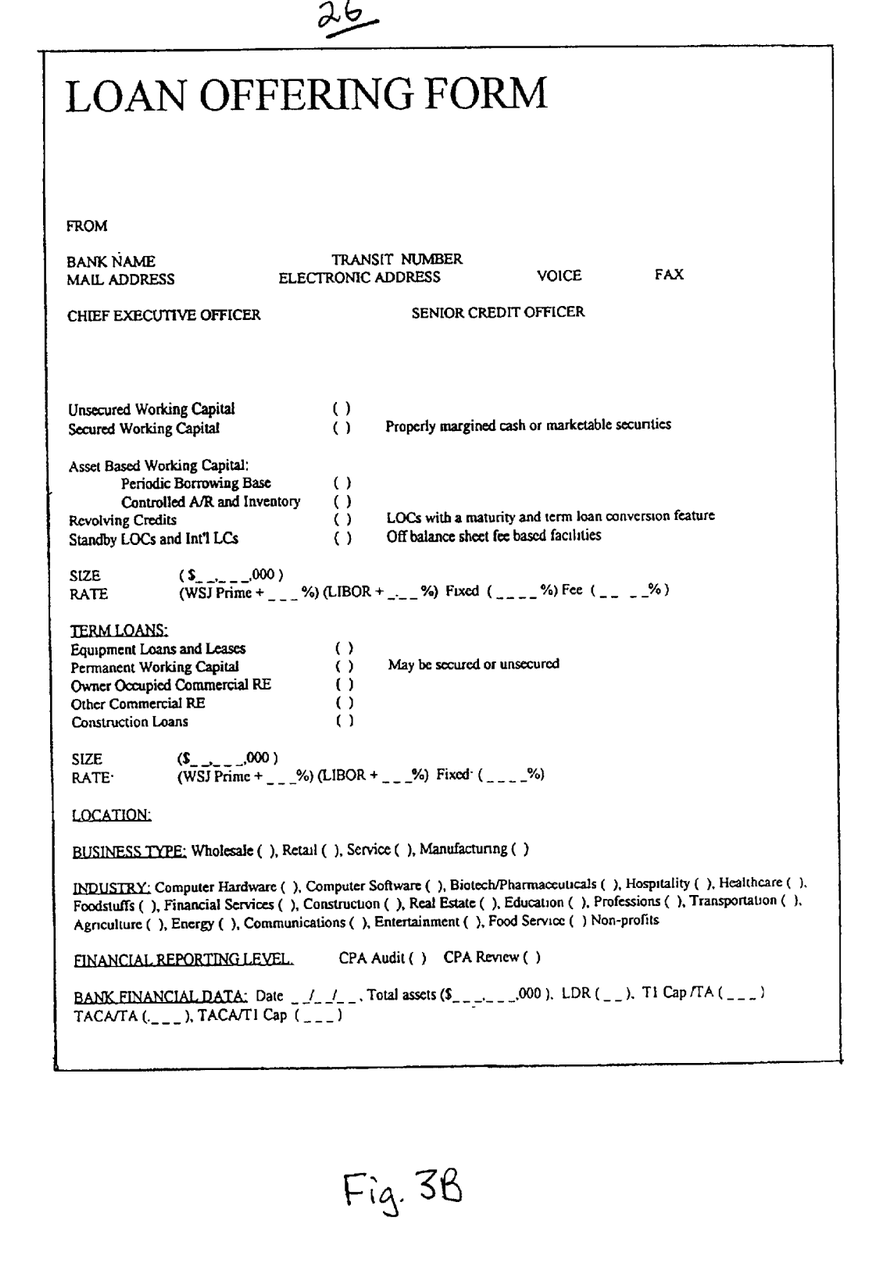
FIG. 3B is an illustration of a loan offering form, according to one embodiment of the present invention.

The database management system 22 searches the loan participation database 20 for one or more items of loan criteria data matching the loan participation opportunity. Loan data pertaining to the loan participation opportunity is preferably provided by the offering network member 12a on a loan offering form 26. The loan offering form 26 preferably includes loan data similar to that provided on the network member application form 24, for example, as shown in FIG. 3B.

In one preferred embodiment, the loan offering form 26 includes loan offering forms 26 in digital format that are electronically provided by the computerized system 10 to the offering network member 12 via the data network 18, similar to the electronic application forms described above. The offering network member 12 completes the electronic loan offering forms 26 and electronically transmits the loan opportunity data to the computerized system 10. When electronically transmitted, the loan opportunity data is automatically obtained by the database management system 22 and used to formulate search queries for searching the loan participation database 20. Alternatively, when the loan offering form 26 is sent by regular mail, facsimile, or other methods of delivery, the requested loan data can be manually entered using the database management system 22 by way of a user interface.

The computerized system 10 also includes a communications interface 30 that controls communication between the network members 12 and the computerized system 10. In particular, the communications interface 30 transmits and receives the electronic application forms 24 and the electronic loan offering forms 26 over the data network 18. The communications interface 30 also routes the data provided on the electronic application forms 24 and loan offering forms 26 to the database management system 22 for entering/updating the database 20 or for searching/retrieving matching data from the database 20. When one or more items of matching data are found in the database 20, the communications interface 30 reports the matching members to the offering member 12a. The communications interface 30 also controls communications between the network members 12, for example, by routing the loan participation offers to the selected network members 12b, 12c and by routing the responses from interested selected members to the offering network member 12a, as will be described in greater detail below.

In one embodiment, the computerized system 10 is implemented using one or more servers, such as a PC running Microsoft WindowsNT® as an operating system or a Sun Workstation running a Unix-based operating system, such as Solaris®. The computerized system 10 can be linked to the data network 18 using one or more different types of media including, but not limited to, the public switched telephone network (PSTN), leased lines, ISDN, and other types of communications media. The server(s) are preferably connected to communications media using one or more routers, modems, or other devices for connecting to a data network.

The communications interface 30 preferably includes conventional web server software and other software that controls communication over the internet. The web server software and other software used to communicate with the Internet preferably provides for secure communication between the network members 12 and computerized system 10, for example, by using a firewall, passwords, encryption, and other security techniques known in the art. The database management system 22 is preferably implemented with conventional database software packages capable of establishing and maintaining the loan participation database 20, such as Microsoft Access® database software and Sybase® database software.

In one embodiment, each of the network members 12 uses a PC or other computing device that has a modem, router, or other device for connecting to the internet, for example, by way of the PSTN, leased lines, ISDN, or other communications media. The network members 12 can access the data network 18 and communicate with the computerized system 10 using conventional internet software, such as Microsoft Internet Explorer, Netscape Navigator, or other "web" browsing or E-mail software. Alternatively, the network members 12 can use software specifically designed for communicating and transacting with the computerized system 10.

Figure 4:
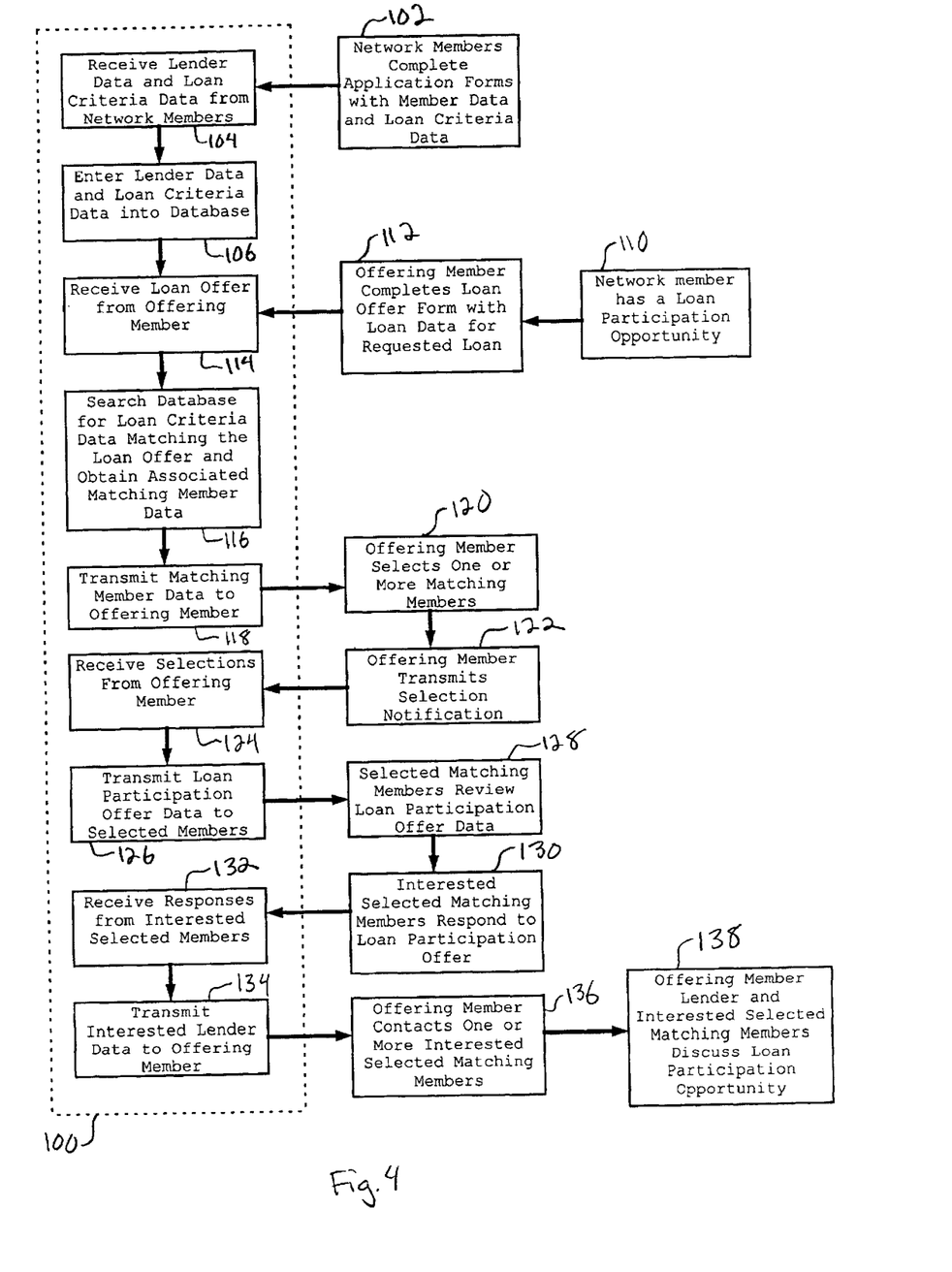
FIG. 4 is a flow chart illustrating the computerized method of establishing a loan participation network, according to one embodiment of the present invention.

In use, the computerized system 10 performs the following method 100, FIG. 4, to establish the loan participation network. First, lending institutions, such as community banks and thrifts, must join the loan participation network (i.e., become network members 12) and the loan participation database 20 must be established/updated with the member data. To become members 12 of the loan participation network, the community banks and thrifts complete the application forms 24 (see FIG. 3A), with the member data and loan criteria data, step 102. The members 12 may also be required to pay a registration fee to be transmitted with the application form 24, for example, by check, money order, electronic funds transfer, or any other payment means.

The member data and loan criteria data provided on the application form 24 is then entered into the loan participation database 20. The computerized system 10 receives the member data and loan criteria data, step 104, and enters the data into the loan participation database 20, step 106. Where electronic application forms 24 are used, the data is received electronically over the data network 18 and automatically entered into the loan participation database 20. For example, the network member logs on to the loan participation network "web" page and completes and submits an application form on-line. Alternatively, the data can be manually entered into the database 20, for example, when the application forms are sent by regular mail, facsimile, or other delivery methods. Once registered, the network member 12 will receive a member ID and password (e.g. by E-mail) for accessing and using the system 10.

Existing network members 12 can also complete application forms 24, step 102, to update the loan participation database 20 with additional or corrected data at any time during the process. In one example, the network member 12 accesses the loan participation network "web" page, enters its member ID and password, and calls up a completed electronic application form 24 from the computerized system 10 with the existing member data and loan criteria data for that network member 12. The network member 12 can then modify or add to the existing data and re-transmit the form with the updated data to the computerized system 10. Alternatively, the updated data can be manually entered into the computerized system 10.

Once the loan participation database 20 contains some member data and loan criteria data, the loan participation network can be utilized by network members to increase their capacity to serve a broader range and size of borrowers (e.g., businesses). The network member 12a is first presented with a loan participation opportunity, step 110, for example, a borrower, such as a business seeking commercial credit, requests a loan from a network member 12a (FIG. 1) which exceeds its legal or house lending limits. The network member 12a completes a loan offering form 26 including the loan data pertaining to the loan participation opportunity, step 112. In one example, the loan offering form 26 is called up electronically, for example, by logging on to the secure "web page" and selecting an option to search the database for matching members. The completed offer form 26 with the requested loan data is electronically transmitted to the computerized system 10 via the secure internet connection. Alternatively, loan offering forms can be obtained and sent by way of mail, facsimile, or other means of delivery. An offering member 12a may also be required to pay an offering fee by way of check, money order, electronic funds transfer, or other payment means.

The computerized system 10 receives the loan offering form 26 and the requested loan data, step 114, and searches the loan participation database 20 for loan criteria data matching the requested loan data, step 116. The percentage of the matching criteria or the closeness of the individual matches can be specified and adjusted. When the requested loan data is electronically received over the data network 18, the searching is automatically conducted with the requested loan data. Alternatively, the requested loan data can be manually entered for searching the database 20, for example, when the loan offering form is sent by regular mail, facsimile, or other delivery methods.

When one or more items of matching loan criteria data is found in the loan participation database 20, the member data associated with the matching loan criteria data is retrieved and a list of one or more matching members and the matching member data is transmitted to the offering member 12a, step 118. For example, where the offering member 12a initiates the search at the loan participation network "web site" and electronically submits the loan offer form 26, the search results or matching member data are presented to offering member 12a on a "web page" for viewing, printing, or saving by the offering member 12a. The matching member data transmitted to the offering member 12a preferably includes the location of each matching member, the network member ID number, and certain financial data. The list of matching members is preferably ordered according to the percentage of matching criteria, for example, with the closest matches listed first.

The offering member 12a receives the matching member data, evaluates the member data, and selects one or more matching members 12 that the offering member 12a wishes to consider for participation in the loan, step 120. One or more selection indicating the selected matching member(s) 12 are then electronically transmitted to the computerized system 10 via the data network 18, step 122. For example, the offering member 12a can immediately transmit the selections from the "web page" presenting the list of matching members. When the computerized system 10 receives the selection(s), step 124, the computerized system 10 electronically transmits the loan participation offer data to each of the selected matching member(s) 12, for example, as E-mail via the data network 18, step 126.

In one example, electronically transmitting the loan participation offers includes transmitting the electronic loan offering form 26 completed by the offering member 12a together with financial data pertaining to the offering member 12a. Upon receiving the loan participation offer data, the selected matching members 12a review the loan data and ascertain their level of interest in the proffered credit, step 128. The selected matching members 12 can be requested to respond by a given date and time. Interested selected matching members 12 electronically transmit a response to the computerized system 10, for example, as E-mail via the data network 18, step 130.

The computerized system 10 electronically receives the response(s) from one or more interested selected matching members 12, step 132, and transmits interested member data pertaining to the interested selected matching members 12 to the offering 1 member 12a, step 134. For example, E-mail can be sent by the system 10 to the offering member 12a with the interested member data, or the offering member 12a can log on to the loan participation network "web site" to retrieve the responses and the interested member data. The interested member data includes at least the identity of the interested selected matching members and their contact information.

The offering member 12a contacts the interested selected matching members 12 to further explore the loan participation opportunity 136. If an agreement among members is reached, the offering member 12a and the interested selected matching members 12 then participate in the loan participation opportunity 138, for example, offer the loan to the borrower 14 as a collective lending entity 16 (FIG. 1). At any point in the process, the system 10 may assess a fee for providing information to the offering member as well as finders fee if the members 12a, 12b, 12c grant the loan. If the offering member 12a needs additional or alternate participation prospects, the offering member 12a can conduct an additional search, for example, by submitting another loan offering form with different loan criteria.

The present invention also contemplates a computerized system and method that performs analytical functions in addition to providing a loan participation database and communications link. One example includes a credit analysis function wherein the computerized system 10 receives credit and financial data pertaining to the borrower, performs a credit analysis of the borrower 14, and provides a credit report to the network members interested in participating in a loan to the borrower. Thus, the computerized system 10 according to the present invention can provide a common approach to ascertaining the credit worthiness of the borrower 14. The network members 12 can access the credit analysis function by way of the data network 18. The present invention further contemplates credit grading, loan review, and industry analysis functions that can be performed by the computerized system 10 and accessed by the network members 12 via the data network 18. These credit quality control functions are useful in the regulatory process.

The computerized system 10 can also provide the documentation needed to close a loan participation to the network members 12. For example, the legal documents needed for different types of loan participation transactions in each of the different states can be maintained electronically in the computerized system and downloaded over the data network 18 by the network members 12.

Other possible uses for the computerized system and method for establishing a loan participation database include, but are not limited to, venture capital, asset-based lending operations, international services, investment banking services, and a system for attracting and compensating the professionals needed to deliver high quality and competitive credit services.

Accordingly, the computerized system and method of the present invention establishes a loan participation network with a capacity to pool financial resources that will allow any size community financial institution to offer commercial credit to small to mid-size businesses. The computerized system and method of the present invention facilitates the location of network members interested in participating in the loan. By using the computerized system and method of the present invention, the community banks and thrifts can offer credit services competitive with major BHCs while maintaining the advantages of local banking.

Modifications and substitutions by one of ordinary skill in the art are considered to be within the scope of the present invention which is not to be limited except by the claims which follow.

What is claimed is:

1. A computerized method for establishing a loan participation network between a plurality of network members, said method comprising the steps of:

establishing a loan participation database containing member data pertaining to each of said plurality of network members and loan criteria data specified by each of said plurality of network members;

receiving a loan participation offer from an offering network member, said loan participation offer including offering network member data and loan participation data pertaining to a loan opportunity;

searching said loan participation database in response to said loan participation offer for matching loan criteria data matching at least a portion of said requested loan data, and obtaining matching member data for at least one matching network member associated with said matching loan criteria data;

providing said matching member data for each said matching network member to said offering network member;

receiving a selection of at least one selected matching network member from said offering network member;

providing a loan participation offer to each said selected matching network member in response to said selection of each said selected matching network member;

receiving a response from at least one interested selected matching member;

providing interested network member data pertaining to each said interested selected matching member to said offering network member in response to said response from each said interested selected matching member.

2. The method of claim 1 wherein said plurality of network members are interconnected with said loan participation database by way of a data network.

3. The method of claim 1 wherein the step of establishing said loan participation database includes receiving a completed network member application form from at least one of said plurality of network members, said completed network member application form including said member data pertaining to at least one of said plurality of network members and said loan criteria data specified by each of said plurality of network members.

4. The method of claim 1 wherein the step of receiving said loan participation offer from said offering network member includes receiving a completed loan offering form from said offering network member, said completed loan offering form including said offering network member data and said loan participation data pertaining to said loan participation opportunity.

5. The method of claim 1 further including the step of updating said loan participation network database.

6. The method of claim 1 wherein said member data pertaining to each of said plurality of network members includes at least a name of each of said plurality of network members and financial data pertaining to each of said plurality of network members.

7. The method of claim 1 wherein said loan criteria data specified by each of said plurality of network members is selected from a group consisting of a loan type, a loan size range, an interest rate range, a business type, a desired industry, and a geographical location.

8. The method of claim 1 further including the steps of:
receiving credit and financial data pertaining to a borrower;
analyzing said credit and financial data pertaining to said borrower and generating a credit report; and
providing said credit report to said interested selected matching members.

9. The method of claim 1 further including the steps of:
maintaining loan participation documentation electronically on said computer system; and
providing said loan participation documentation to said network members upon request by said network members.

10. A computerized method for establishing a loan participation network between a plurality of network members, said method comprising the steps of:
establishing a loan participation database containing member data pertaining to each of said plurality of network members and loan criteria data specified by each of said plurality of network members, wherein said plurality of network members are in communication with said loan participation database by way of a data network;
electronically receiving a loan participation offer from an offering network member over said data network, said loan participation offer including offering network member data and loan participation data pertaining to a loan participation opportunity;

searching said loan participation database in response to said loan participation offer for matching loan criteria data matching at least some of said loan participation data, and obtaining matching member data for at least one matching network member associated with said matching loan criteria data;

electronically transmitting said matching member data for each said matching network member to said offering network member over said data network;

electronically receiving a selection of at least one selected matching network member from said offering network member over said data network;

electronically transmitting said loan participation offer to each said selected matching network member over said data network in response to said selection of each said selected matching network member;

electronically receiving a response from at least one interested selected matching member over said data network; and electronically transmitting to said offering member interested network member data pertaining to each said interested selected matching member over said data network in response to said response from each said interested selected matching member.

11. The method of claim 10 wherein the step of establishing 2 said loan participation database includes:
electronically transmitting network member application forms over said data network to said plurality of network members;
electronically receiving completed network member application forms from at least one of said plurality of network members over said data network, said completed network member application form including said member data pertaining to said at least one of said plurality of network members and said loan criteria data specified by said at least one of said plurality of network members.

12. The method of claim 10 wherein the step of receiving said loan participation offer from said offering network member includes:
electronically transmitting a loan offering form to said offering network member over said data network; and
electronically receiving a completed loan offering form from said offering network member over said data network, said completed loan offering form including said offering network member data and said loan participation data pertaining to said loan participation opportunity.

13. The method of claim 10 further including the step of updating said loan participation network database.

14. The method of claim 10 wherein said member data pertaining to each of said plurality of network members includes at least a name of each of said plurality of network members and financial data pertaining to each of said plurality of network members.

15. The method of claim 10 wherein said loan criteria data specified by each of said plurality of network members is selected from a group consisting of a loan type, a loan size range, an interest rate range, a business type, a desired industry, and a geographical location.

16. A computerized system for establishing a loan participation network between a plurality of network members using a data network, said system comprising:
a loan participation database containing member data pertaining to each of said plurality of network members and loan criteria data specified by each of said plurality of network members;

data entering means for entering said member data and said loan criteria data into said loan participation database;

loan participation offer receiving means, electronically linked to said data network, for receiving a loan participation offer from an offering network member over said data network, said loan participation offer including offering network member data and loan participation data pertaining to a loan participation opportunity;

data searching means, responsive to said loan participation offer receiving means, for searching said loan participation database in response to said loan participation offer for matching loan criteria data matching at least some of said loan participation data and obtaining matching member data for at least one matching network member associated with said matching loan data;

matching member data transmitting means, electronically linked to said data network and responsive to said searching means, for transmitting said matching member data for each said matching network member to said offering network member over said data network, whereby said offering network member selects at least one selected matching network member;

selection receiving means, linked to said data network, for receiving a selection of each said selected matching network member from said offering network member;

loan participation offer transmitting means, electronically linked to said data network and responsive to said selection receiving means, for transmitting said loan participation offer to each said selected matching network member over said data network, whereby at least one interested selected matching member responds to said loan participation offer;

response receiving means, electronically linked to said data network, for receiving a response from each said interested selected matching member;

member data transmitting means, electronically linked to said data network and responsive to said response receiving means, for transmitting to said offering network member interested member data pertaining to each said interested selected matching member over said data network in response to said response from each said interested selected matching member.

17. The system of claim 16 further including means for generating electronic application forms and electronic loan offering forms, wherein said electronic application forms provide said member data and said loan criteria data in said loan participation database, and wherein said electronic loan offering forms provide said requested loan data.

18. The system of claim 16 further including means for analyzing credit of a borrower, and for providing a credit report to said accepting selected network members.

19. The system of claim 16 further including means for providing loan participation documentation to said offering network member and to at least one of said interested selected matching members.

20. A computerized system for establishing a loan participation network between a plurality of network members using a data network, said system comprising:

a loan participation database containing member data pertaining to each of said plurality of network members and loan criteria data specified by each of said plurality of network members;

a database management system linked to said loan participation database for entering said member data and said loan criteria data into said data base and for searching said loan participation database in response to a loan participation offer from an offering network member, said loan participation offer including loan participation data pertaining to a loan participation opportunity, wherein said database management system searches for matching loan criteria data matching at least some of said loan participation data and obtains matching member data for at least one matching network member associated with said matching loan criteria data; and a communications interface linked to said data network and said database management system, for controlling electronic communication between said plurality of network members and said database management system, wherein said communications interface receives said member data and associated said loan criteria data for entering into said loan participation database, wherein said communications interface receives said loan participation data for searching said loan participation database, wherein said communications interface transmits said matching member data for each said matching network member to said offering network member over said data network, wherein said communications interface receives a selection from said offering network member of at least one selected matching network member, wherein said communications interface transmits said loan participation data to each said selected matching network member over said data network in response to said selection of each said selected matching network member, wherein said communications interface receives a response from at least one interested selected matching member, and wherein said communications interface transmits to said offering member interested member data pertaining to each said interested selected matching member over said data network in response to said response from each said interested selected matching member.

* * * * *